(12) United States Patent
Lookingbill (10) Patent No.: US 8,484,151 B1
(45) Date of Patent: Jul. 9, 2013

(54) PREDICTING PARKING AVAILABILITY

(75) Inventor: Andrew Lookingbill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 12/981,278

(22) Filed: Dec. 29, 2010

(51) Int. Cl.
*G06F 17/00* (2006.01)
*G06N 5/02* (2006.01)

(52) U.S. Cl.
USPC ............................................................ 706/46

(58) Field of Classification Search
None
See application file for complete search history.

(56) References Cited

U.S. PATENT DOCUMENTS

| | | | |
|---|---|---|---|
| 6,418,425 | B1 | 7/2002 | Maeda et al. |
| 7,516,010 | B1 * | 4/2009 | Kaplan et al. ................. 701/426 |
| 2002/0161520 | A1 * | 10/2002 | Dutta et al. ................... 701/213 |
| 2003/0014213 | A1 | 1/2003 | Yokota |
| 2003/0204312 | A1 | 10/2003 | Woronow et al. |
| 2007/0042770 | A1 * | 2/2007 | Yasui et al. ................... 455/428 |
| 2008/0048885 | A1 * | 2/2008 | Quinn ........................ 340/932.2 |
| 2012/0135746 | A1 * | 5/2012 | Mohlig et al. ............. 455/456.1 |

OTHER PUBLICATIONS

Westwood Professional Services Inc, Mall of America Draft Final Visitor and Parking Study, 2006.*
Caceres, J.P., et al., "Deriving origin-destination data from a mobile phone network," IET Intelligent Transportation Systems, Mar. 2007, vol. 1, No. 1, pp. 15-26.
Diebel, J., et al., "An Application of Markov Random Fields to Range Sensing," NIPS 2005, 8 pages.
Ferris, B., et al., Gaussian Processes for Signal Strength Based Location Estimation, Proc. of Robotics Science and Systems, 2006, 8 pages.
Hightower, J., et al., "Particle Filters for location estimation in ubiquitous computing: A Case study," Lectures Notes in Computer Science, Springer, 2004, 18 pages.
Ratti, C., et al., "Mobile Landscapes: Using location data from cell phones for urban analysis," In Environment and Planning B: Planning and Design, 2006, pp. 727-748, vol. 33.
Reades, F., et al., "Cellular Census: Explorations in Urban Data Collection," IEEE Pervasive Computing, Jul.-Sep. 2007, pp. 10-18.
Shewchuk, J., "An Introduction to the Conjugate Gradient Method Without the Agonizing Pain," Technical Report CMU-CS-TR-94-125, Carnegie Mellon University, 1994, 64 pages.
Kindermann, R., et al., "Markov Random Fields and Their Applications," Contemporary Mathematics, 1980, pp. 1-142.
Wang, P., et al., "Understanding spatial connectivity of individuals with non-uniform population density," Philosophical Transactions of the Royal Society A, Aug. 2009, pp. 3321-3329, vol. 367.

* cited by examiner

*Primary Examiner* — Jeffrey A Gaffin
*Assistant Examiner* — Mikayla Chubb
(74) *Attorney, Agent, or Firm* — Fenwick & West LLP (57) ABSTRACT

The parking availability for a geographic area is predicted using a parking availability model. The geographic population density for the geographic area is first predicted. The predicted geographic population density is then applied to the parking availability model to produce a prediction of the parking availability for the geographic area. The parking availability model comprises a function that relates predicted geographic population densities with parking availabilities for a geographic area. The predicted parking availability for the geographic area is stored in a computer-readable storage medium. The parking availability predictions may be displayed as a layer within a map, and may be produced for a specifically requested geographic area, or a general geographic area.

19 Claims, 7 Drawing Sheets

PREDICTING PARKING AVAILABILITY

BACKGROUND

1. Field of Disclosure

This disclosure relates in general to the field of location-based services and in particular to predicting parking availability for a geographic area.

2. Description of the Related Art

People often would appreciate insight into real-time parking availability for a geographic area. For example, a person driving into an urban neighborhood might appreciate knowing how much parking is available in that neighborhood, and the parking availability in surrounding neighborhoods. However, determining parking availability for large geographic areas and distributing this information to interested parties is difficult. Manually determining parking availability in real time requires considerable effort; surveying parking spaces by vehicle or on foot is tedious, requires massive manpower, and the gathered information is difficult to distribute.

Some municipalities have installed "smart" parking meters which provide usage data and indicate parking availability for individual locations. However, the use of these meters is limited to a small percentage of the overall parking capacity in many areas. In addition, smart meters generally do not provide parking information to the general public. As a result, parking information from smart meters is both extremely limited and unavailable to the public at-large.

SUMMARY

The above and other issues are addressed by a method, computer, and computer-readable storage medium storing instructions for predicting parking availability for a geographic area. Embodiments of the method comprise predicting the geographic population density for the geographic area. The predicted geographic population density is applied to a parking availability model, producing a prediction of the parking availability for the geographic area. The parking availability model comprises a function that relates predicted geographic population densities with parking availability for a geographic area. The predicted parking availability for the geographic area is then stored in a computer-readable storage medium.

Embodiments of the computer comprise a non-transitory computer-readable storage medium storing executable computer program instructions for predicting parking availability for a geographic area. The instructions predict the geographic population density for the geographic area. The instructions further apply the predicted geographic population density to a parking availability model, producing a prediction of the parking availability for the geographic area. The parking availability model comprises a function that relates predicted geographic population densities with parking availability for a geographic area. The instructions then store the predicted parking availability for the geographic area in a computer-readable storage medium. The computer additionally comprises a processor for executing the computer program instructions.

Embodiments of the computer-readable storage medium store executable computer program instructions for predicting parking availability for a geographic area. The instructions predict the geographic population density for the geographic area. The instructions further apply the predicted geographic population density to a parking availability model, producing a prediction of the parking availability for the geographic area. The parking availability model comprises a function that relates predicted geographic population densities with parking availability for a geographic area. The instructions then store the predicted parking availability for the geographic area in a computer-readable storage medium.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
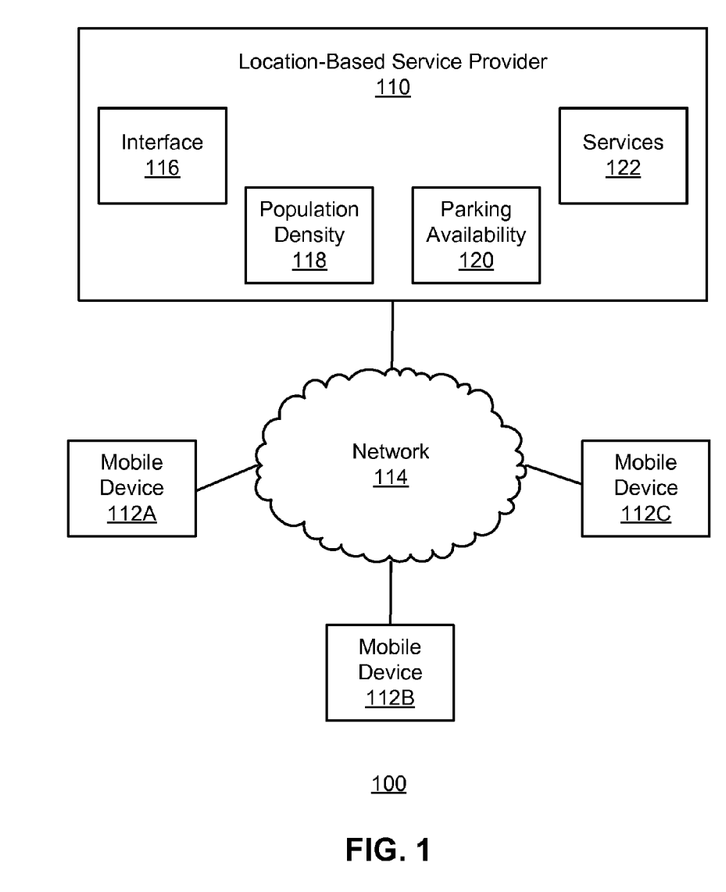
FIG. 1 is a high-level block diagram illustrating a computing environment for predicting parking availability according to one embodiment.

FIG. 1 is a high-level block diagram illustrating a computing environment 100 for predicting parking availability according to one embodiment. As shown, the computing environment 100 includes a location-based service provider (the "service provider") 110 and multiple mobile devices 112A-C connected through a network 114. Only one service provider 110 and three mobile devices 112 are illustrated in FIG. 1 in order to simplify and clarify the present description. Embodiments can have millions of mobile devices 112 and multiple service providers 110. There can be other entities in the computing environment 100 as well.

The mobile devices 112 are electronic devices that can communicate with the service provider 110 via the network. In one embodiment, the mobile devices 112 include web-browsing functionality allowing the mobile devices 112 to access location-aware services provided by the service provider 110. In addition, the mobile devices 112 can include position-determining functionality, such as Global Positioning System (GPS) receivers. Examples of mobile devices 112 include mobile telephones, portable digital assistants (PDAs), notebook and tablet computers, and automotive GPS receivers. Although this description refers to the devices as "mobile," the devices need not be portable. The phrase "mobile device" can also include a device that is typically stationary, such as a desktop computer.

A mobile device 112 is used by an end-user to request services from the service provider 110. One such service is mapping. The end-user, or an application executing on the mobile device 112, requests map information for the geographic area proximate to the mobile device. In turn, logic within the mobile device 112 determines the current geographic location of the device, and requests a map centered on this location from the service provider 110. The map is then displayed on a display of the mobile device 112 and/or used to provide an auxiliary service.

The service provider 110 is a hardware device and/or software program configured to provide the mobile devices 112 with location-based services. As shown, the service provider 110 includes an interface module 116 for interfacing between the service provider 110 and the mobile devices 112. The interface module 116 receives requests for location-based services and other data from the mobile devices 112 and provides data supporting the services in return. The interface module 116 can include, for example, a web server for receiving and responding to requests received from the mobile devices 112.

The service provider 110 also includes a population density module 118 for predicting the number of people in a given geographic area at a given time (the "geographic population density" or just "population density"). In one embodiment, the population density module 118 uses the center points of the map request from the mobile devices 112 as indications that the mobile device users are located at those points. In addition, the population density module 118 may use a Markov Random Field (MRF) model that incorporates both current and historical data in order to estimate the total number of mobile device users in the area. The MRF model leverages the spatial and temporal consistency of mobile device usage patterns and provides significant accuracy improvements over estimates based solely on instantaneous observations. From the number of mobile device users, the population density module 118 predicts the number of people in the geographic area and, hence, the area's population density. Other embodiments use alternative methods of determining the population density of a geographic area.

A parking availability module 120 predicts the availability of vehicle parking spaces within a geographic area. In one embodiment, the parking availability module 120 uses a parking availability model to predict parking availability. The parking availability model, in turn, is a function of the current population density predicted by the population density module 118. For instance, the parking availability module 120 can receive a current population density prediction for a given area and produce a vehicle parking availability prediction for the area. In one embodiment, the parking availability model correlates historical parking availability with historical geographic population density for a geographic area, and uses this correlation to predict parking availability given a current predicted population density in the area. The model can also account for variations in the relationship between population density and parking availability at different dates and times. The type of vehicle for which parking availability is predicted can vary in different embodiments and might be, for example, an automobile, truck, or bicycle.

A services module 122 within the service provider 110 provides location-based services to the mobile devices 112, including services that use the parking availability predictions produced by the parking availability module 120. In one embodiment, a user requests and receives a parking availability prediction using a mobile device 112. Alternatively, the services module 122 may automatically request and receive parking availability predictions for display to and/or interaction with the user in response to the user accessing map functionality on the mobile device 112. The services module 122 can use the parking availability predictions to supplement parking availability data from smart meters or road sensors to provide estimates of parking availability in areas where smart meters or road sensors are non-existent or sparse.

The services module 122 can provide maps to the mobile device that include layers graphically illustrating parking availability for the areas shown in the maps. One such layer graphically illustrates the parking availability using a heat map or other technique. For example, parking availability predictions can be displayed in a color-coded format with red indicating that parking availability is low and green indicating that parking availability is high. Alternatively, parking availability predictions may be displayed in percentages of available parking spaces, numbers of available parking spaces, or amounts of time which would be required in order to find a parking space. The services module 122 can provide user interface tools that allow a user to toggle the parking availability map layer on or off, adjust the layer to show parking availability at different times or dates, or control other aspects of the presentation.

The network 114 enables communications between the service provider 110 and the mobile devices 112. In one embodiment, the network 114 uses standard communications technologies and/or protocols and can include the Internet as well as mobile telephone networks. Thus, the network 114 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 114 can use custom and/or dedicated data communications technologies instead of, or in addition to, the ones described above.

Computer Architecture

Figure 2:
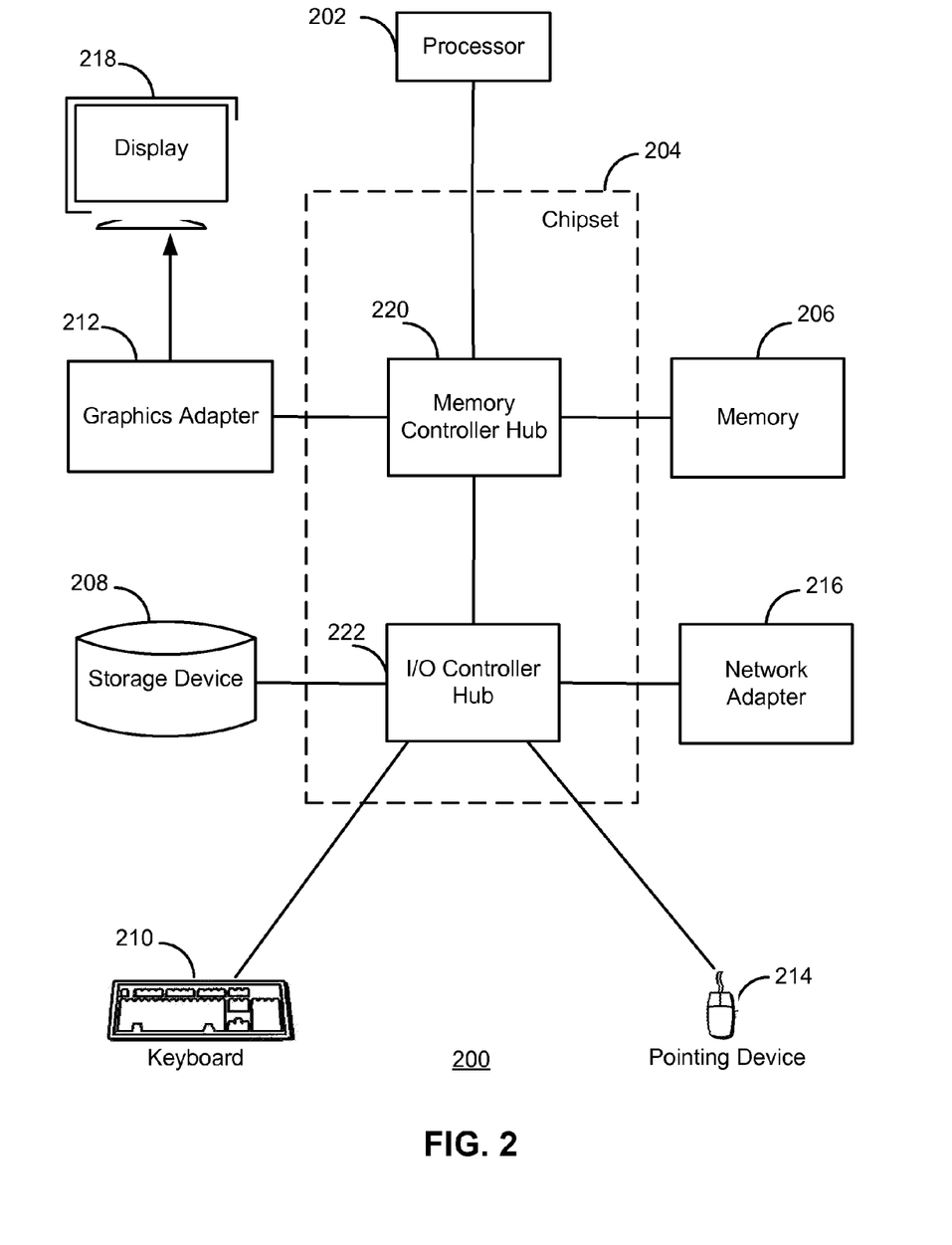
FIG. 2 is a high-level block diagram illustrating a typical computer for use as a service provider or mobile device.

FIG. 2 is a high-level block diagram illustrating a typical computer 200 for use as a service provider 110 or mobile device 112. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer 200 to the network 116.

As is known in the art, a computer 200 can have different and/or other components than those shown in FIG. 2. In addition, the computer 200 can lack certain illustrated components. In one embodiment, a computer 200 acting as the service provider 110 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)). As another example, a mobile device 112 might comprise a smartphone with limited processing power and a touch screen interface.

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Example Architectural Overview of the Population Density Module

Figure 3:
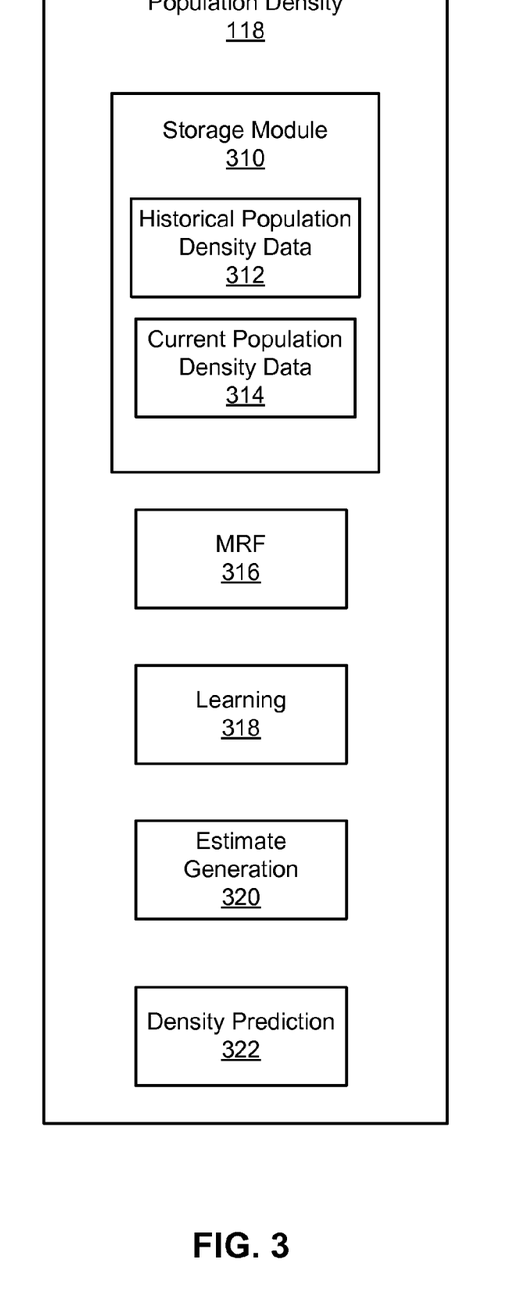
FIG. 3 is a high-level block diagram illustrating a detailed view of modules within the population density module according to one embodiment.

FIG. 3 is a high-level block diagram illustrating a detailed view of modules within the population density module 118 according to one embodiment. Some embodiments of the population density module 118 have different and/or other modules than the ones described herein. Similarly, the functions can be distributed among the modules in accordance with other embodiments in a different manner than is described here. Likewise, the functions can be performed by other entities.

A storage module 310 stores data used by the population density module 118. Examples of such data include historical and current mobile device usage data, intermediate data created and used during the population density prediction process, and predicted population densities. The storage module 310 may include a relational database or another type of database.

As shown in FIG. 3, an embodiment of the storage module 310 stores a dataset 312 of historical population density data. In one embodiment, the historical data describe data points received from mobile devices 112 within a defined time interval, such as within one year. A data point is an observation that a mobile device 112 was used at a particular geographic location at a particular date and time. Thus, a request for a location-based service received from a mobile device 112 that identifies a location is a data point. In one embodiment, the storage module 310 stores data points corresponding to the center points of map requests received by the service provider over the defined time interval. The storage module 310 may provide the parking availability module 120 with historical population density data automatically, at the request of the parking availability module 120, or at any other time.

In one embodiment, the historical data describe data points for a particular geographic area for which the population density will be predicted. For example, the historical data can describe data points for a particular city such as San Francisco. In addition, the locations of the data points are quantized within the geographic area. The geographic area is divided into a grid, and the locations of the data points are mapped to nodes within the grid. In one embodiment, the grid has 1000 nodes, with each node representing roughly a two-by-two block square of a city. Thus, in one embodiment, the center point of each map request received from a mobile device 112 is mapped to the node in which the center point is located. In one embodiment, the nodes of the grid vary in size.

For instance, node size may represent historical population densities, with each node configured to represent roughly the same number of people; larger nodes would correlate to smaller population densities for a given area, and vice versa.

Further, in one embodiment the data points within the historical dataset 312 are aggregated by time. For example, the data points can be aggregated into hours. Thus, for a given week, a node of the grid has 168 (24*7) values, with each value representing the number of data points received from that node within an hour of that week.

A current dataset 314 within the storage module 310 stores current data describing data points observed in a current time interval, e.g., a current hour. The current dataset 314 can be populated, for example, by the interface module 116 of the service provider 110 as service requests are received from the mobile devices 112. The data within the current dataset 314 can move to the historical dataset 312 as the data age. In one embodiment, the data within the current dataset 314 are organized into the same grid and temporal aggregation as the data within the historical dataset 312. Thus, the current data describe the number of data points observed for a particular node of a grid for a geographic area within a current hour. In one embodiment, the data in the current dataset 314, as well as the data in the historical dataset 312, are anonymous so that the mobile devices 112 and end-users cannot be identified.

A MRF module 316 maintains data describing a MRF model that the population density module 118 uses to estimate the number of mobile devices used within geographic areas. In one embodiment, the MRF model has state variables x, observations y, and prior (historical) measurements π. The MRF model can be visualized as having the state variables x arranged as nodes in a regular 3-D lattice. A plane of the lattice corresponds to the grid of the geographic area described above; neighboring nodes reflect areas that neighbor other geographical areas in reality. The third dimension in the lattice reflects the influence of time slices immediately preceding and following the time slice for which the population density is being estimated (i.e., the state of the grid in the time slices preceding and following the time slice represented by the current grid).

The state variables x are unobservable and represent the actual number of mobile devices 112 being used in given areas at a given time. The MRF module 316 uses a set of potentials and priors to capture the relationship between the values of x and the neighbors in time and space, as well as the current and historical observations. The potentials and priors are rules about how to use the datasets 312, 314 to produce the estimate.

In one embodiment, a "prior measurement potential" enforces a rule that the current usage estimate of the number of mobile devices 112 being used in a node of the grid should be close to the historical usage for the node. The prior measurement potential is defined as:

$$\Psi = \sum_L k_\pi (x_i - \pi_i)^2 \qquad (1)$$

In equation (1), ψ represents a cost associated with the prior measurement potential. The potential itself is quadratic and captured over a set of indices L, where $k_\pi$, is a weight, $x_i$ represents the unobservable variable for node i (the current number of mobile devices being used in node i), and $\pi_1$ represents the historical measurement for node i (the number of mobile devices historically observed at that node).

In addition, an "observation potential" enforces a rule that the current usage estimate for a node in the grid should be close to the current observed usage for the node. The observation potential is defined as:

$$\Phi = \sum_L k_y (x_i - y_i)^2 \qquad (2)$$

In equation (2), $\Phi$ represents a cost associated with the observation potential. This potential is also quadratic and captured over a set of indices L, where $k_y$ is a weight, $x_i$ represents the unobservable variable for node i, and $y_i$ represents the current observed readings for node i (i.e., the number of data points observed for the node in the current period).

A "spatial smoothness prior" enforces a rule that the current usage estimate for a node in the grid should be close to the usage estimates for the node's neighbors in space. There are four neighbors j in the lattice arrangement, corresponding to the four neighbors of a node in the grid. The spatial smoothness prior is defined as:

$$\Omega = \sum_i \sum_{j \in N(i)} k_x (x_i - x_j)^2 \qquad (3)$$

In equation (3), $\Omega$ represents a cost associated with the spatial smoothness prior. This prior is quadratic and captured for each node and each node's neighbors. In the equation, $k_x$ is a weight, $x_i$ represents the unobservable variable for node i, and represents the unobservable variable for node i's j spatial neighbors.

A "temporal smoothness prior" enforces a rule that the current usage estimate for a node in the grid should be close to the usage estimates for the node's neighbors in time. There are two time neighbors j in the lattice arrangement, corresponding to the nodes of the time intervals preceding and following the current node i. The temporal smoothness prior is defined as:

$$T = \sum_i \sum_{j \in N(i)} k_\tau (x^i - x^j)^2 \qquad (4)$$

In equation (4), T represents a cost associated with the temporal smoothness prior. This prior is quadratic and captured for each node and each node's neighbors. In the equation, k, is a weight, $x^i$ represents the unobservable variable for node i, and $x^j$ represents the unobservable variable for node i's j time neighbors.

Each of the equations has a parameter representing the weight that the equation has in the MRF model (i.e., $k_\pi$, $k_y$, $k_x$, $k_\tau$). A learning module 318 uses the historical dataset 312 to learn the values of the weight parameters. In one embodiment, the learning module 318 selects two weeks of historical data from the dataset 312. The two weeks can be selected at random or based on other considerations and need not be temporally adjacent.

To learn the values of the weight parameters, the learning module 318 treats one of the two weeks as the test dataset and treats the other week as the training dataset. The learning module 318 optimizes the MRF model to determine values of the unobservable variables x (the optimization is described in more detail below) and changes the values of the parameters to minimize the root mean squared error (RMSE) between estimated usage produced by the MRF model when using the training dataset as current observations and the test dataset.

Specifically, to learn a weight parameter, the learning module 318 treats the other three parameters as constants (e.g. with values of '1') and changes the value of the parameter being learned until a value is found that minimizes the RMSE. In one embodiment, learning module 318 minimizes the error by performing a hill-climbing optimization. The learning module 318 repeats this process for each of the other three parameters in order to learn the values. The process is then repeated, for all the parameters, until a predetermined number of iterations has occurred, or until the RMSE has dropped below some threshold. Moreover, some embodiments of the learning module 318 repeat this process multiple times using different weeks from the historical dataset 312 to refine the parameter values.

Depending upon the embodiment, the values of the weight parameters can be fixed or can vary based on time. In the embodiment described above, the learning module 318 determines fixed values for the parameters. That is, the parameters have the same values across all of the times in the dataset.

In another embodiment, the values of the weight parameters vary based on time or other factors. In one embodiment, the learning module 318 uses 24 different values for each parameter, one for each hour of the day. The learning module 318 uses the same learning technique described above, except that the module solves for the parameters at each hour of the day, producing 24 different values for each parameter. Using multiple parameter values can enhance the accuracy of the MRF model. For example, the weight of the temporal smoothness prior can change such that temporal smoothness has greater weight at times when the population density is unlikely to significantly change, e.g., between 2-3:00 AM, and lesser weight at times when the population density is likely to significantly change, e.g., between 4-5:00 PM.

In one embodiment, the weight of the spatial smoothness prior varies depending upon the location of the nodes being operated upon. Varying the spatial smoothness prior weight allows for incorporation of knowledge regarding the locations of the nodes. For example, a spatial smoothness prior having a relatively large weight can be used with nodes representing adjacent areas that typically have similar population densities, while a spatial smoothness prior having a relatively small weight can be used with nodes representing adjacent areas that typically have different population densities.

An estimate generation module 320 generates an estimate of the current number of mobile devices 112 being used within the areas represented by the nodes of the MRF model. In one embodiment, the estimate generation module 320 uses the values of the weight parameters learned by the learning module 318 in combination with the historical 312 and current 314 datasets to solve for the state variables x in the MRF model. For this usage, the historical data can be the aggregation of data received in a predetermined time interval, such as a year, scaled so that the mean over the dataset approximately matches the mean of one week's worth of data.

Recall that $x_i$ represents an unobservable variable for a node i, i.e., the current number of mobile devices being used within the area represented by that node. In one embodiment, the estimate generation module 320 calculates the state variables x as the mode of the posterior distribution of the MRF model by solving for x as an optimization problem.

To solve for a state variable of a node $x_i$, say node $x_0$, the estimate generation module 320 identifies the values of the related variables in the MRF model. Two variables, $x^1$ and $x^{-1}$, respectively represent node $x_0$'s two neighbors in time.

Variable $x^{-1}$ is the value of node $x_0$ in the prior measurement period (e.g., the preceding hour). Variable $x^1$ is the value of node $x_0$ in the subsequent measurement period (e.g., the next hour). As the future value of $x_0$ is not known, one embodiment of the estimate generation module 320 uses a "historical future" value for the node. Thus, if node $x_0$ represents an area at 3:00 PM, the estimate generation module 320 can use the historical value of the area at 4:00 PM as the value for $x^1$. In addition, four variables, $x_{00}$, $x_{01}$, $x_{10}$, and $x_{11}$, respectively represent the node's four neighbors in the space defined by the grid of the MRF model. One variable, $y_0$, represents the current observation of the number of mobile devices being used in the area represented by node $x_0$. Another variable, $\pi_0$, represents the historical value for node $x_0$.

The estimate generation module 320 uses these values in the MRF model, as represented by equations (1)-(4) described above, and optimizes by solving for the values of $x_i$ that minimize cost, i.e., minimize the sum of $\psi$, $\Phi$, $\Omega$, and T. As described by the equations, the more $x_i$ varies from its historic value, its currently observed values, the values of its neighbors in space, and the values of its neighbors in time, the greater the cost. Minimizing cost based on $x_i$ thus produces values for $x_i$ that optimally conform to the model given the weights learned by the learning module 318. After optimization, the value of a given state variable for a node, e.g., $x_0$, represents the estimate of the current number of mobile devices 112 being used within the area represented by that node.

In one embodiment, the estimate generation module 320 uses the conjugate gradient (CG) algorithm to minimize the cost. This algorithm simultaneously solves for $x_i$ in all four equations, for all nodes. In the MRF model, nodes are influenced by adjacent nodes and, thus, each node is dependent on every other node. For an initial node, the adjacent nodes are given a predetermined value (e.g., 0). The nodes quickly converge to their "real" values as the optimization is performed.

A density prediction module 322 uses the estimates of numbers of mobile devices being used within given areas produced by the estimate generation module 320 to predict the population densities of the areas. In general, the density prediction module 322 predicts the population density as a function of the number of mobile devices being used. For example, the density prediction module 322 can multiply the estimated number of mobile devices being used in an area by scale factor that accounts for people in the area that are not using and/or carrying mobile devices, in order to calculate a prediction of total people within the area. The scale factor can vary in different areas. For example, the density prediction module 322 can use different scale factors for areas known to contain primarily pedestrian traffic and areas known to contain primarily vehicular traffic. Similarly, the scale factor can vary over time. In one embodiment, the density prediction module 322 is absent and the estimate of numbers of mobile devices is used as the population density prediction.

Overview of Methodology for Determining Weight Parameters for MRF Model

Figure 4:
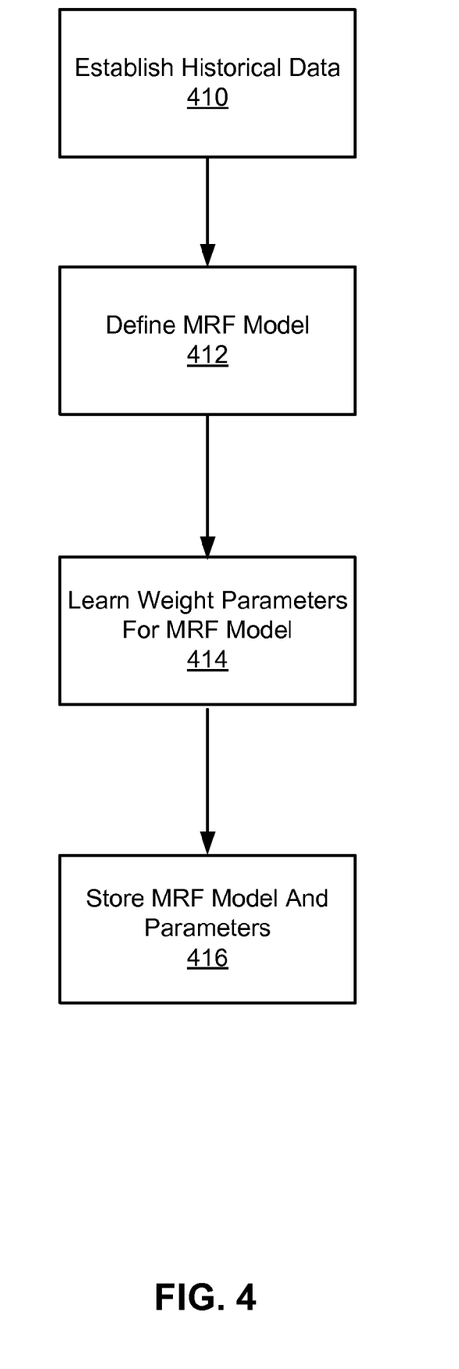
FIG. 4 is a flowchart illustrating a method of learning the values of the weight parameters for a MRF population density model according to one embodiment.

FIG. 4 is a flowchart illustrating a method of learning the values of the weight parameters for a MRF population density model according to one embodiment. In one embodiment, the method of FIG. 4 is performed by the population density module 118, although some or all of the method can be performed by other modules in other embodiments. In addition, other embodiments can perform the steps of the method in different orders and can include different and/or additional steps.

The population density module 118 establishes 410 a historical population density dataset 312. The historical data may describe data points received from mobile devices 112 observed within a defined historical time interval. For example, the historical dataset 312 can describe the data points observed in a prior year. The population density module 118 also defines 412 a MRF model. For example, the MRF model can be defined by a human operator who provides computer program instructions that implement the MRF model. In one embodiment, the MRF model has state variables x, observations y, and prior (historical) measurements $\pi$, and is represented by equations (1)-(4) described above. The MRF model can be visualized as having the state variables x arranged as nodes in a regular 3-D lattice.

The MRF model has parameters representing weights that the equations have in the overall model. The population density module 118 learns 414 the values of the weight parameters by analyzing the historical dataset 312. The population density module 118 selects two sets of historical data from the dataset 312, treats one set as test observations, treats the other set as training observations, and computes the unobserved variables using the data. The population density module 118 performs optimizations on the weight parameters to learn values that minimize RMSE between the estimates produced by the MRF model using the training data as the current observations and the test data. The population density module 118 stores 416 the learned weight parameter values and data describing the MRF model in, e.g., the storage module 310.

Example Architectural Overview of the Parking Availability Module

Figure 5:
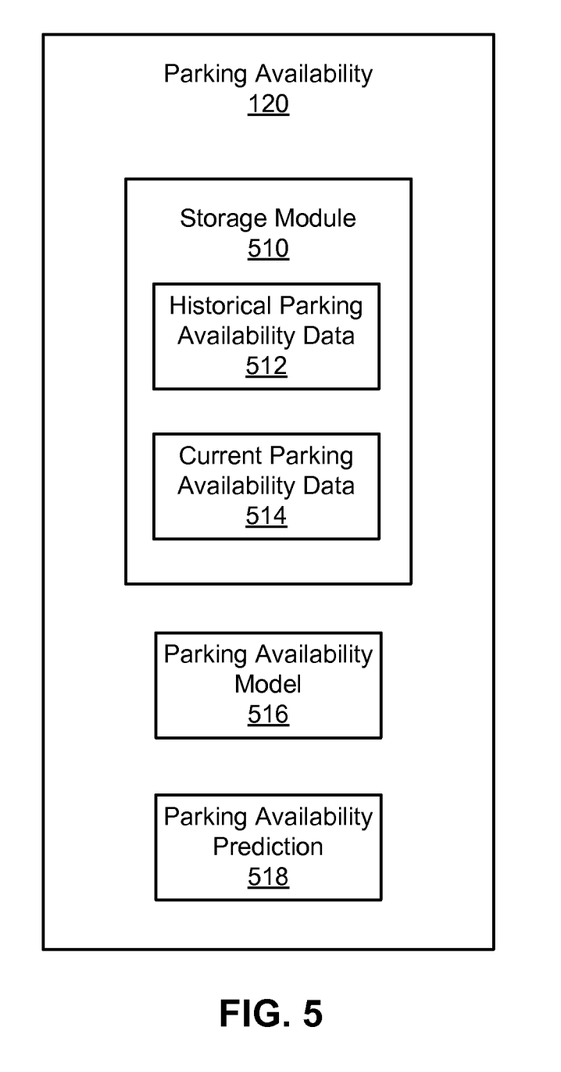
FIG. 5 is a high-level block diagram illustrating a detailed viewed of modules within the parking availability module according to one embodiment.

FIG. 5 is a high-level block diagram illustrating a detailed viewed of modules within the parking availability module 120 according to one embodiment. Some embodiments of the parking availability module 120 have different and/or other modules than the ones described herein. Similarly, the functions can be distributed among the modules in accordance with other embodiments in a different manner than is described here. Likewise, the functions can be performed by other entities.

A storage module 510 stores data used by the parking availability module 120. Examples of such data include historical and current parking availability data, intermediate data created and used during the parking availability prediction process, and parking availability predictions. The storage module 510 may include a relational database or another type of database.

As shown in FIG. 5, an embodiment of the storage module 510 stores a dataset 512 of historical parking availability data. In one embodiment, the historical data comprise descriptions of vehicle parking availability within specified geographic areas at specific dates and times. In one embodiment, the historical parking availability data are organized in a similar manner as the geographic population data. That is, a geographic area such as a city is organized into nodes of a grid, and each node within the grid describes parking availability for the portion of the geographic area represented by the node. Each node can have associated parking availability data for different dates and/or times of day.

In one embodiment, the historical parking availability data are obtained by observing the actual vehicle parking available within the geographic areas. For example, the parking availability data for a particular geographic area can be observed using manual techniques including having a human observer tally available vehicle parking within the area at a given date and time (and/or related measurements, such as the number of occupied parking spaces). The observer can observe the parking from street level, via an aerial survey, via stationary or mobile cameras, etc. The vehicle parking availability data for the area can also be observed using automated techniques. For example, the observations can be formed of data reported by smart parking meters that electronically report whether associated parking spaces are occupied or free, from parking garages that electronically report utilization rates, and/or via an automated analysis of visual data. The historical parking data can represent the vehicle parking availability using a variety of different techniques. For example, the data can specify the number of available parking spaces in a given geographic area at a given time, the percentage of spaces available, and/or the average time required to find a parking space.

A current dataset 514 within the storage module 510 stores current parking availability predictions. Current parking availability predictions may be stored for an entire area, such as a city, and/or for a particular time period, such as an hour. In such instances, current parking availability predictions may be produced on a fixed time interval, such as once an hour; these predictions may then be stored in dataset 514 and retrieved whenever a current parking availability query is received within the time interval. Alternatively, current parking availability predictions may be produced any time current population density data is updated or received and/or when a query is received. In one embodiment, the data within the current dataset 514 are organized into the same grid and temporal aggregation as the data within the historical dataset 512.

A parking availability model module 516 creates and maintains data describing a parking availability model for predicting the availability of parking within geographic areas. In one embodiment, the parking availability model reflects a relationship between population density and parking availability. However, the relationship itself can vary depending upon geographic area, date/time, and/or other factors.

In one embodiment, the parking availability model is trained using the historical parking availability data 512 and the population density predictions from the population density module 118. For example, for a given geographic area such as a neighborhood of a city defined by a node of the grid, training data can be obtained from the historical parking availability data 512 indicating the amount of parking available at 2:00 PM on each Monday of the preceding year. The training data, in turn, are correlated with the population density predictions for the same geographic area at the same time and day. This correlation can be performed by calculations that perform the equivalent of plotting the parking availability against the population density on a graph, and fitting a curve to the plotted points. The curve describes a parking availability function indicating the relationship between parking availability and population density for that geographic area at 2:00 PM on Mondays. The technique described above can be performed to learn parking availability functions for multiple geographic areas at different times and dates. These functions collectively form the parking availability model.

Many variations of the parking availability model are possible in different embodiments. In one embodiment, the model is invariant over date and time. To train this type of model, a given geographic area's relationship between population density and parking availability is plotted for multiple different dates/times. For example, the relationship can be plotted at different times of the same day and/or at different times on different days to learn a single parking availability function for the area that is invariant over date and time. Similarly, models can be trained that are invariant over just time by learning a single parking availability function for the area using multiple observations from a same day and learning different functions for each day of the year or week. Likewise, models can be trained that are invariant over just date by learning a single parking availability function for the area using multiple observations made at the same time on different days. In addition, models can be trained to be invariant over a time period such as one hour or a few hours.

In one embodiment, rather than training a separate model for each geographic area (i.e., each node of the grid), a model is trained for a type of geographic area, and then applied to all areas of that type. For example, the geographic areas represented by the nodes can be classified as specific types of areas such as residential, commercial, or industrial. A model can be trained for a representative subset of the residential areas and then applied to all nodes representing areas classified as residential. Alternatively, a model can be trained using aggregate data for all of the residential areas, and then applied to all such areas. Models can likewise be trained for other types of geographic areas.

A parking availability prediction module 518 produces a prediction of current parking availability using the parking availability model. In one embodiment, the parking availability prediction module 518 receives a parking availability request that identifies a specific geographic area. The parking availability prediction module 518 interacts with the population density module 118 to obtain the current predicted population density for the geographic area. The parking availability prediction module 518 also obtains the parking availability model applicable to the geographic area at the current date/time. The parking availability prediction module 518 then applies the population density to the model to produce the parking availability prediction for the geographic area.

Depending upon the embodiment, the parking availability request may contain different information and the parking availability prediction module 518 may handle the request differently. For example, the request can specify a population density and a date/time in addition to the geographic area, and the parking availability prediction module 518 can use the parking availability model to predict the parking availability given the specified population density and date/time. Moreover, the request can specify a date/time for which the current predicted population density is unavailable (e.g., a future date). In such case the parking availability prediction module 518 can use the stored historical population density data 312 to determine the predicted population density for the specified date/time, and calculate the predicted parking availability therefrom.

Overview of Methodology for Predicting Parking Availability

Figure 6:
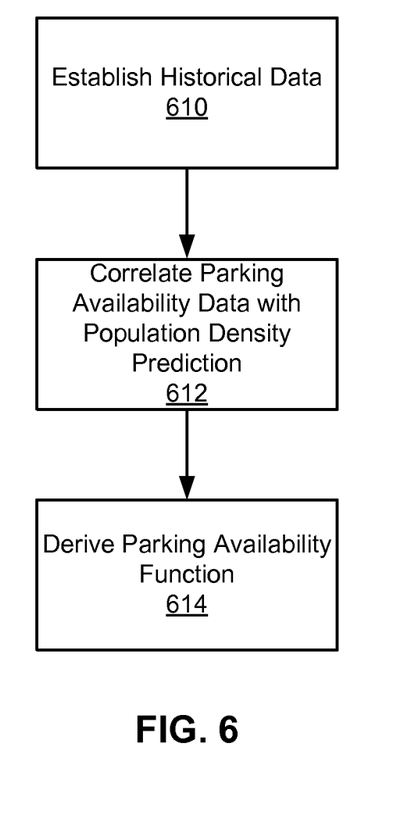
FIG. 6 is a flowchart illustrating a method of creating a parking availability model according to one embodiment.

FIG. 6 is a flowchart illustrating a method of creating a parking availability model according to one embodiment. In one embodiment, the method of FIG. 6 is performed by the parking availability model module 516, although some or all of the method can be performed by other modules in other embodiments. In addition, other embodiments can perform the steps of the method in different orders and can include different and/or additional steps.

The parking availability model module 516 establishes 610 a historical parking availability dataset 512. As described above, this dataset may be created by observing parking availability in geographic areas using manual and/or automated techniques. The parking availability model module 516 correlates 612 the historical parking availability data with the population density predictions for the geographic areas. Then, the parking availability model module 516 derives 614 parking availability functions describing the correlations. These parking availability functions collectively form the parking availability model.

Figure 7:
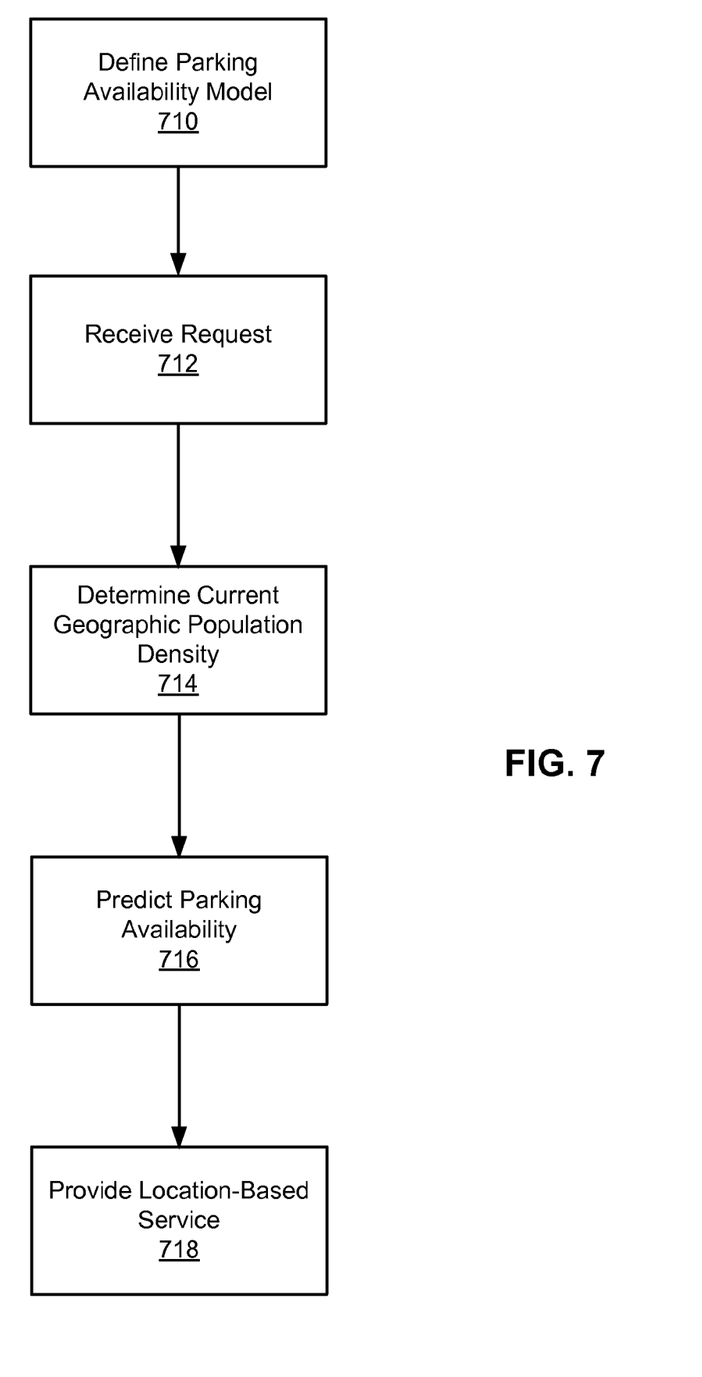
FIG. 7 is a flowchart illustrating a method of predicting parking availability for a geographic area and providing a location-based service according to one embodiment.

FIG. 7 is a flowchart illustrating a method of predicting parking availability for a geographic area and providing a location-based service according to one embodiment. In some embodiments, the method of FIG. 7 is performed in all or in part by the service provider 110, although in other embodiments, all or part of the method can be performed by other entities. In addition, other embodiments can perform the steps of the method in different orders and can include different and/or additional steps.

The service provider 110 defines 710 a parking availability model using the techniques described above. The service provider 110 receives 712 a request for a location-based service from a user. For example, a user using a mobile device 112 can request a map centered on a specified location, and also request that a parking availability layer be displayed on the map.

Upon receiving the request, the service provider 110 determines 714 the current predicted geographic population density for the geographic area referenced by the request. The service provider 110 applies the population density to the parking availability model to predict the parking availability for the area. In one embodiment, the service provider 110 predicts 716 parking availability by applying a parking availability function for the geographic area at the current date/time to the predicted population density. The service provider 110 uses the parking availability prediction to provide 718 the requested location-based service, such as by providing a map overlay that graphically illustrates parking availability for the referenced geographic area.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of predicting parking availability for a geographic area, comprising:
defining a Markov Random Field (MRF) model for estimating a number of mobile devices used within the geographic area;
applying current data describing a number of mobile devices currently observed within the geographic area and historical data describing a number of mobile devices historically observed within the geographic area to the MRF model to produce an estimate of a number of mobile devices currently being used within the geographic area;
predicting a geographic population density for the geographic area responsive to the estimated number of mobile devices currently being used within the geographic area;
applying the predicted geographic population density to a parking availability model to produce a prediction of the parking availability for the geographic area, wherein the parking availability model comprises a function relating predicted geographic population density for the geographic area to predicted parking availability for the geographic area; and
storing the predicted parking availability for the geographic area in a computer-readable storage medium.

2. The method of claim 1, further comprising:
observing actual parking availability within the geographic area at a given time; and
correlating the observed actual parking availability within the geographic area at the given time with a predicted geographic population density for the geographic area at the given time to derive the function relating predicted geographic population density to predicted parking availability for the geographic area.

3. The method of claim 2, wherein the observing and correlating are performed for a plurality of geographic areas to derive a plurality of functions relating predicted geographic population density to predicted parking availability for the plurality of geographic areas.

4. The method of claim 2, wherein the actual parking availability within the geographic area is observed at a plurality of different times of day to produce training data and wherein the correlating correlates the training data with predicted geographic population density estimates for the geographic area at the plurality of different times of day to derive a plurality of functions relating predicted geographic population density to predicted parking availability for the geographic area at the plurality of different times of day.

5. The method of claim 2, wherein the actual parking availability within the geographic area is observed at a plurality of different times of day to produce training data and wherein the correlating correlates the training data with predicted geographic population density estimates for the geographic area at the plurality of different times of day to derive a single function relating predicted geographic population density to predicted parking availability for the geographic area at the plurality of different times of day.

6. The method of claim 2, wherein the actual parking availability within the geographic area is observed on a plurality of different days to produce training data and wherein the correlating correlates the training data with predicted geographic population density estimates for the geographic area on the plurality of different dates to produce a function relating predicted geographic population density to predicted parking availability for the geographic area on the plurality of different days.

7. The method of claim 1, further comprising:
classifying the geographic area as a type of geographic area selected from among a plurality of different types of geographic areas;
wherein the function relates predicted geographic population density to predicted parking availability for the classification type of the geographic area.

8. The method of claim 1, for comprising:
receiving a request for predicted parking availability for the geographic area from a mobile device; and
providing the predicted parking availability for the geographic area to the mobile device responsive to receiving the request.

9. The method of claim 8, wherein providing the predicted parking availability comprises:
providing a map of the geographic area, wherein the map includes a layer graphically illustrating the predicted parking availability for the geographic area.

10. A computer for predicting parking availability for a geographic area, comprising:
a non-transitory computer-readable storage medium storing executable computer program instructions comprising instructions for:
defining a Markov Random Field (MRF) model for estimating a number of mobile devices used within the geographic area;

applying current data describing a number of mobile devices currently observed within the geographic area and historical data describing a number of mobile devices historically observed within the geographic area to the MRF model to produce an estimate of a number of mobile devices currently being used within the geographic area;

predicting a geographic population density for the geographic area responsive to the estimated number of mobile devices currently being used within the geographic area;

applying the predicted geographic population density to a parking availability model to produce a prediction of the parking availability for the geographic area, wherein the parking availability model comprises a function relating predicted geographic population density for the geographic area to predicted parking availability for the geographic area; and storing the predicted parking availability for the geographic area in a computer-readable storage medium; and a processor for executing the computer program instructions.

11. The computer of claim 10, further comprising instructions for:

observing actual parking availability within the geographic area at a given time; and correlating the observed actual parking availability within the geographic area at the given time with a predicted geographic population density for the geographic area at the given time to derive the function relating predicted geographic population density to predicted parking availability for the geographic area.

12. The computer of claim 10, further comprising instructions for:

classifying the geographic area as a type of geographic area selected from among a plurality of different types of geographic areas;

wherein the function relates predicted geographic population density to predicted parking availability for the classification type of the geographic area.

13. The computer of claim 10, further comprising instructions for:

receiving a request for predicted parking availability for the geographic area from a mobile device; and providing the predicted parking availability for the geographic area to the mobile device responsive to receiving the request.

14. The computer of claim 13, wherein providing the predicted parking availability comprises:

providing a map of the geographic area, wherein the map includes a layer graphically illustrating the predicted parking availability for the geographic area.

15. A non-transitory computer-readable storage medium storing executable computer program instructions for predicting parking availability, the instructions comprising instructions for:

defining a Markov Random Field (MRF) model for estimating a number of mobile devices used within the geographic area;

applying current data describing a number of mobile devices currently observed within the geographic area and historical data describing a number of mobile devices historically observed within the geographic area to the MRF model to produce an estimate of a number of mobile devices currently being used within the geographic area;

predicting a geographic population density for the geographic area responsive to the estimated number of mobile devices currently being used within the geographic area;

applying the predicted geographic population density to a parking availability model to produce a prediction of the parking availability for the geographic area, wherein the parking availability model comprises a function relating predicted geographic population density for the geographic area to predicted parking availability for the geographic area; and storing the predicted parking availability for the geographic area in a computer-readable storage medium.

16. The non-transitory computer-readable storage medium of claim 15, further comprising instructions for:

observing actual parking availability within the geographic area at a given time; and correlating the observed actual parking availability within the geographic area at the given time with a predicted geographic population density for the geographic area at the given time to derive the function relating predicted geographic population density to predicted parking availability for the geographic area.

17. The non-transitory computer-readable storage medium of claim 15, further comprising instructions for:

classifying the geographic area as a type of geographic area selected from among a plurality of different types of geographic areas;

wherein the function relates predicted geographic population density to predicted parking availability for the classification type of the geographic area.

18. The non-transitory computer-readable storage medium of claim 15, further comprising instructions for:

receiving a request for predicted parking availability for the geographic area from a mobile device; and providing the predicted parking availability for the geographic area to the mobile device responsive to receiving the request.

19. The non-transitory computer-readable storage medium of claim 18, wherein providing the predicted parking availability comprises:

providing a map of the geographic area, wherein the map includes a layer graphically illustrating the predicted parking availability for the geographic area.

\* \* \* \* \*